L. G. COOK.
INSTRUMENT FOR MEASURING STANDING TIMBER.
APPLICATION FILED JULY 29, 1912.

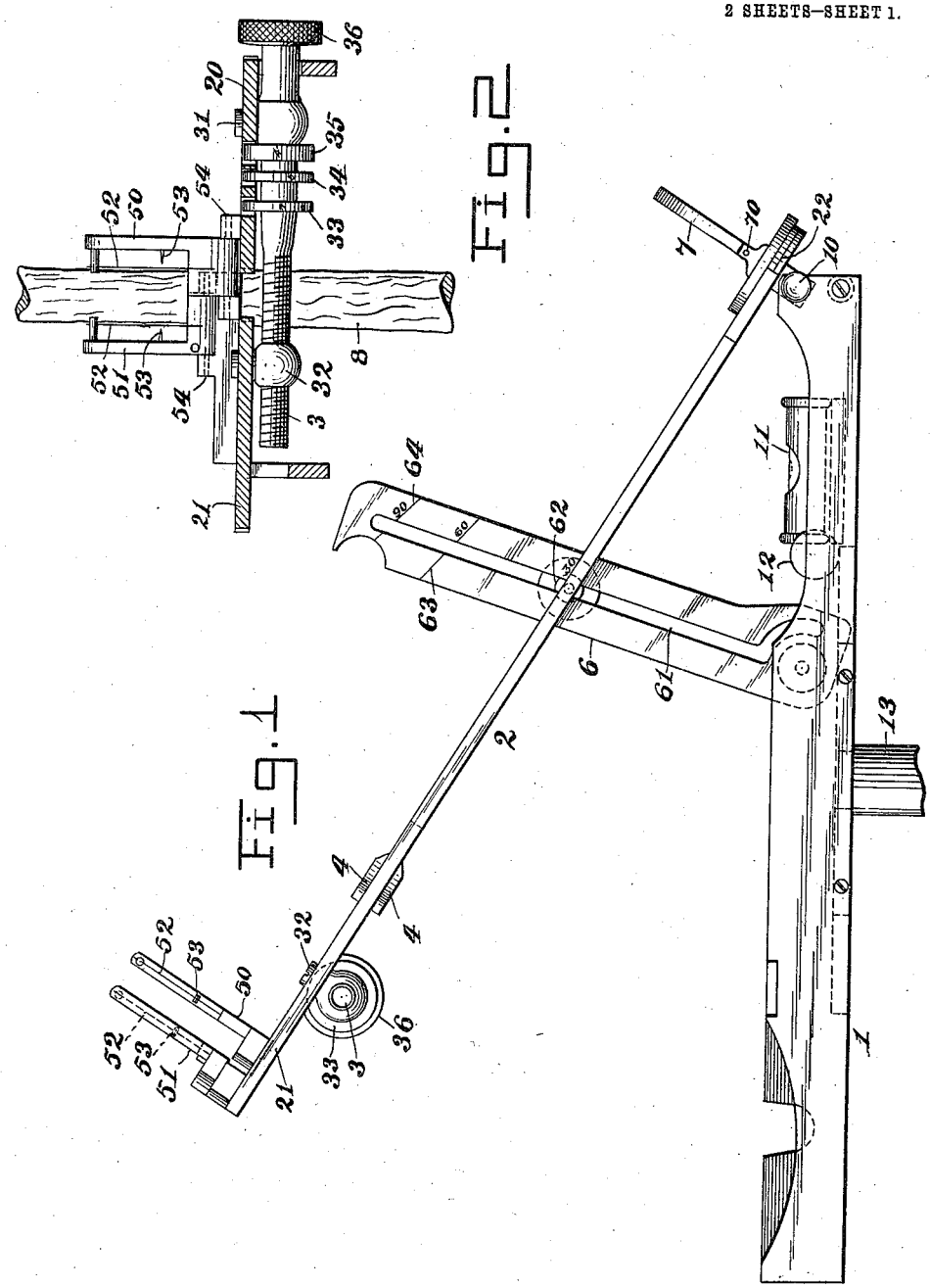

1,072,577.

Patented Sept. 9, 1913.

2 SHEETS—SHEET 2.

Witnesses:

Inventor.
Ludlow G. Cook
By
Atty

UNITED STATES PATENT OFFICE.

LUDLOW G. COOK, OF EVERETT, WASHINGTON.

INSTRUMENT FOR MEASURING STANDING TIMBER.

1,072,577.   Specification of Letters Patent.   Patented Sept. 9, 1913.

Application filed July 29, 1912. Serial No. 711,972.

*To all whom it may concern:*

Be it known that I, LUDLOW G. COOK, a citizen of the United States, residing at Everett, in the county of Snohomish, State of Washington, have invented a new and useful Improvement in Instruments for Measuring Standing Timber, of which the following is a specification.

This invention relates to a device for determining accurately the number of feet of lumber in standing timber before it is cut.

The object is to provide a light and portable instrument of simple construction whereby the measurement of the diameter of a tree may be made correctly and from which the contents thereof in feet, board measure, can be definitely ascertained by the use of reliable formulæ or tables, instead of relying upon an estimate in which the personal judgment of an individual is the prime factor.

The best methods in present use, of which I have knowledge, for estimating the number of feet in standing timber, employ no elements of certainty as a base for calculation. It is common practice to count the number of trees and estimate their diameters and their height. It is rare indeed that any two of several experienced estimators will agree as to the number of feet, board measure, in any given area or number of trees.

To overcome this indefiniteness, uncertainty, and unreliability is the aim and purpose of the present invention.

My invention comprises the novel parts and combinations of parts which will be hereinafter described and particularly pointed out in the claims.

In the accompanying drawings I have shown my invention embodied in the form now preferred by me.

Figure 3:
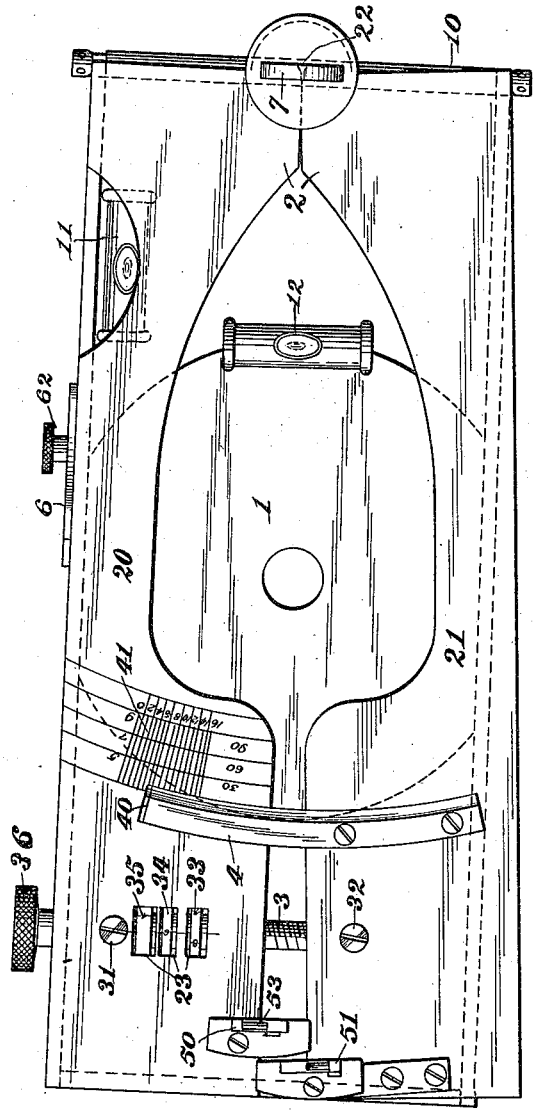
Figure 4:
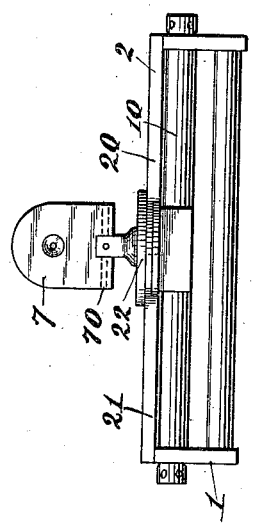

Figure 1 is a side elevation of the device with the sighting bar raised. Fig. 2 is an elevation showing the outer part of the sighting bar, the frame being in section just back of the adjusting screw. Fig. 3 is a plan, the line of sight being normal to the sighting bar. Fig. 4 is an elevation of the pivot end and the near sight.

My invention is embodied in an instrument by which the actual diameter of the tree trunk may be measured at definite and known heights, said measurements serving as a base from which to calculate the timber contents of the logs which would come from the tree, use being made of tables to determine such contents, after the same manner as in measuring logs after cut. This instrument uses a sighting bar having thereon elevation sights and two separable or adjustable direction sights, the elevation sights being used to determine the height at which the measurement of the diameter of the tree trunk is to be made and the adjustable direction sights to determine its diameter at that point, the latter sights employing the same principle as is used in stadia surveying and range finding.

The instrument is mounted upon a base 1 which is provided with means for securing the base to a support, as a detachable stem 13 adapted to be secured to a Jacob's staff or a tripod. This base is provided with levels 11, 12, whereby it may be leveled. To one end of this base is pivoted a sighting bar or frame 2 which carries a single near sight 7 pivoted at its lower end at 70, and distant elevation sights and separable or adjustable direction sights. These distant sights are mounted upon arms 50, 51, which are preferably pivoted at their lower end, as at 54, so that they may be turned down for convenient and safe carriage when not in use. Each bar 50, 51, carries an elevation sight 53, which is fixed in position. It also carries a vertical sighting wire 52, these constituting the direction sights.

The sighting bar or frame 2 is composed of two parts which are adjustable laterally of the line of sight, each carrying one of the sighting standards 50 or 51. The manner of construction of these parts may be widely varied. As I have shown them herein they consist of two bars or plates 20 and 21, substantially alike and pivoted together at 22 so that they may be given a relative swinging movement in their plane. One of these plates, as the plate 21, has bars 4 secured thereto and engaging the surface of the other plate 20. Preferably two bars are used, one above and the other below the plates, whereby they serve to mutually support the plates and prevent vertical displacement. These bars 4 are preferably curved upon an arc having its center coincident to that by which the plates 20 and 21 are pivoted together. The plate 20 over the surface of which the bars or arms 4 slide, has a scale 41 marked thereon and the upper bar or arm 4 has a mark 40 serving as a pointer to indicate the reading of the scale 41 which is to be taken.

The scale 41 is divided into three sections at one end of which appear the figures 30, 60, and 90. These figures refer to the height of the upper end of the log which is being measured, its length being in all cases the standard adopted, or, as herein used, 30 feet. These lengths may be varied as will best suit local conditions and customs, those given being well adapted to suit the conditions and customs prevailing in this locality. At the inner end of the cross lines of this scale appear figures which correspond with numbers of the lines, numbering from one end. These figures form one factor to be used in computing the diameter of the log, the other factor being the figures 5, 7 or 9 appearing at one end of the scale, the one to be chosen being determined by the height at which the observation is directed and being the one which appears on the same division at the other end of the scale.

An adjusting means is provided whereby the separation of the direction sights may be controlled and set. As shown, this consists of a screw 3 which threads into a stud 32, which is secured to the half 21 of the sighting bar and has a rotative bearing in another stud 31 carried by the other half 20 of the sighting bar. This screw is also provided with three disks 33, 34 and 35 which project into slots 23 in the plate 20 and have marks extending across their faces and accompanied by figures. These disks constitute a vernier scale by which the indications of the scale 41 may be supplemented to secure a more accurate reading.

The sighting bar is secured in proper elevated position, as by the slotted arm 6 and securing screw 62, the arm 6 being provided with such marks as are necessary to cause the elevation sights to indicate the proper height of observation, as 30, 60 or 90 feet. I have shown but three such indications, these consisting of lines 63 which are marked 30, 60, and 90, these being the heights for which the device shown has been scaled. When the sighting arm has been set upon one of these marks it will read correctly for the upper end of a log at that height.

This device is used as follows: The Jacob's staff, or whatever is used for its support, is placed at a fixed distance from the tree to be measured and as nearly as possible so that the instrument will come at the level at which the stump is to be cut. The distance at which the instrument shown is supposed to set is sixteen paces or about forty-eight feet. If desired, this fact may be accurately told by sighting at the base of the tree after the instrument has been leveled and with the sighting bar down, or when lying parallel with the base 1. The sighting bars are then elevated, say to the mark or scale on the arm 6 which is intended for use in measuring at a height of thirty feet. The adjusting screw 3 is then turned until the direction sights 52 coincide with the side edges of the tree trunk at the level indicated by the elevation sights 53. The reading indicated upon the scale 41 opposite the mark or pointer 40 upon the arm 4 is taken, this being multiplied by 5, as the log being measured is at a height of 30 feet, the figure 5 being placed in the division of the scale which contains the 30 foot elevation. The product obtained gives the diameter of the log at that elevation. With the diameter of the log at its small end and its length known, its timber contents may be determined by reference to a standard table. Such table may be affixed to the instrument if desired. To determine the contents of the next 30 foot log, the sighting bars are raised to the position on the arm 6 which is marked 60 and the process of adjustment and reading again carried out. To determine the contents of the next 30 foot log the sighting bars are raised to the position on arm 6 marked 90, and properly adjusted and read as in the previous measurements.

In adjusting the direction sights to accurately measure the diameter of the tree trunk, it will often happen that the mark 40 upon arm 4 will not agree exactly with any of the lines upon the scale 41. When this occurs the line of scale 41 is to be taken which is toward the zero end of the scale and, after the computation of the diameter of the tree has been made by multiplying the indication of the scale 41 by the factor 5, 7 or 9 as the case may be, the reading upon the disk 35, 34 or 33 as the case may be, is added to the product. As an illustration, suppose the device is being used to measure the first log at the height of 30 feet. The mark or pointer 40 is just beyond the line 7 in the scale 41. This amount, 7, is therefore to be multiplied by 5, the figure placed at the right of scale 41 and which applies to observations taken at a height of 30 feet. This product does not, however, give an exact and complete result, for the reason that the mark 40 was beyond the line 7. Each of these spaces represents five inches at a height of 30 feet which is the reason for using the figure 5 as a multiplier. The disk 35, it will be seen on examination, has five marks thereon dividing its periphery into five equal spaces. Therefore, when mark 40 is between lines 7 and 8 disk 35 has made seven complete revolutions and a little over, and by reading this disk through slot 23 the figure thereon exposed to view indicates the excess in inches above the seven revolutions of the disk and is to be added to the product of 7 and 5, and the amount will be the exact diameter in inches. The disk 34 is similarly divided into seven equal spaces, this corresponding with the number opposite the middle division of scale 41 and the reading of this disk is to be taken when making an observation at a height of 60 feet if mark 40 on arm 4 does not register exactly with a line on the scale 41. The other disk 33 is divided into nine equal parts and the reading of this disk is to be taken in an observation at the height of 90 feet in the same manner as in the case of 30 feet and 60 feet. In all cases the divisions of the disks 35, 34, and 33 correspond with the figures used as multipliers and placed at the right of scale 41, opposite the division of the scale suited for the height at which the observation is taken.

It is to be here stated that when plates 20 and 21 are drawn together by means of adjusting screw 3 each disk registers at zero as viewed through slots 23, and mark 40 on arm 4 registers at zero on scale 41. As thus positioned, the direction sights 52 are in direct line with each other when observed through near sight 7. Each complete revolution of the disks moves mark 40 just one space on scale 41 representing five inches, seven inches, and nine inches, for disks 35, 34, and 33, respectively.

By the use of this device the contents of standing timber may be accurately measured, and the result being wholly based upon careful mathematical computations, the element of personal judgment is eliminated as completely as it is possible so to do; excepting, of course, the question of the quality of the timber.

I claim as my invention—

1. A device for use in measuring standing timber comprising a sighting bar, means for determining the elevation of said sighting bar, separable direction sights carried by said sighting bar, and means for indicating the degree of separation of said direction sights.

2. A device for use in measuring standing timber, comprising a frame member, a near sight carried upon said frame member, a pair of distant direction sights carried by said frame member, means for adjusting said direction sights toward and from each other, a scale and a pointer therefor, one associated with one of said direction sights and the other associated with the other direction sight, and means for determining the elevation of the line of sight.

3. A device for use in measuring standing timber comprising a base and means for leveling the same, a sighting frame pivoted to the base to swing vertically, and having thereon a near sight, a distant elevation sight and a pair of distant direction sights adjustable toward and from each other, a scale and pointer associated, each with its respective direction sight, and an elevation adjusting means connecting said base and sighting frame and provided with an indicating device.

4. A device for use in measuring standing timber, comprising a base, a sighting bar or frame pivoted to said base to swing vertically, an elevating mechanism connecting base and sighting bar and containing an elevation scale, and means carried by said sighting bar to determine the diameter of the trunk of the tree on the line of sight.

5. A device for use in measuring standing timber, comprising a base, means for leveling the base, a sighting bar pivoted to the base to swing vertically, an adjusting bar connecting base and sighting bar and carrying elevation indications, a near sight and a distant elevation sight carried by the sighting bar, a pair of distant direction sights carried by the sighting bar, and means for adjusting said direction sights toward and from each other and separation indicating members movable in conformity with said direction sights.

6. A device for use in measuring standing timber, comprising a base, means for leveling said base, a sighting bar hinged to swing vertically upon the base, an elevation adjusting bar connecting base and sighting bar and having an elevation scale thereon, the sighting bar being composed of two parts hinged to swing upon a pivot normal with their plane to separate their outer or distant end, a near sight upon the pivoted end of the sighting bar, distant elevation sights carried by said sighting bar, a distant direction sight carried by each half of the sighting bar, means for adjusting said halves of the sighting bar to vary the separation of the distant direction sights, and a scale and pointer therefor, one carried by each half of the sighting bar.

7. A device for use in measuring standing timber, comprising a base provided with means for securing it to a support, means for leveling said base, a sighting bar, elevation sights and direction sights carried by the sighting bar, means for adjusting said sights to thereby measure the diameter of the tree at different elevations.

LUDLOW G. COOK.

Witnesses:
SCHUYLER DURYEE,
F. G. RYMOND.